UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

PHENOLIC CONDENSATION PRODUCT.

1,253,262. Specification of Letters Patent. Patented Jan. 15, 1918.

No Drawing. Application filed December 4, 1915. Serial No. 65,049.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Phenolic Condensation Products, of which the following is a specification, this application being a continuation in part of my copending application for Letters Patent filed March 20, 1913, Serial No. 755,799.

My invention relates to resinous condensation products and it has special relation to the manufacture of such products by reacting upon phenolic substances with substances containing active replaceable methylene groups in the presence of carbon dioxid.

The general object of my invention is to employ carbon dioxid as a condensing reagent in the preparation of resinous condensation products, thereby improving the properties of such products and rendering them suitable for use in certain molding processes and for other purposes.

Another object of my invention is to provide a simple and inexpensive method of producing resinous condensation products which may profitably be employed upon a large commercial scale.

In the production of resinous condensation products by reacting upon phenol or other allied substances with formaldehyde or with other bodies containing active replaceable methylene groups, it has been customary to make use of condensing agents which are either basic or strongly acid, ammonia and sulfuric acid being typical examples of the condensing agents employed. It is substantially impossible to remove all of the condensing agent from the final products of these reactions and the residual condensing agent, if strongly basic or acid, may constitute a source of danger from explosions when brought into contact with other substances with which they are capable of reacting to form explosive compounds. Such residual condensing agents may also cause damage to the materials to which the condensation products may be applied as coatings or with which they may be combined in mixtures.

According to one modification of my present invention, I employ carbon dioxid as the condensing agent in the production of phenolic condensation resins, and I find that it may be removed very thoroughly from the final products on account of its gaseous nature, while the small amount that remains in the products is so weakly acid as to be entirely harmless.

For the purposes of my present invention, the expressions "phenol" and "phenolic substance" are intended to include not only phenol itself, but its homologues, isomers or compounds which are capable of reacting to form phenolic condensation products. The materials which I may employ under the general class of substances containing replaceable methylene groups comprise the aldehydes, notably formaldehyde, their polymers, such as paraform, trioxymethylene and the like and also such substances as hexamethylene-tetramin.

In carrying out my process with formaldehyde or other aldehyde material, various methods may be employed. For example, carbon dioxid may be caused to pass through aqueous phenol in sufficient quantity to saturate the liquid, and a 40% water solution of formaldehyde may then be added, preferably in about molecular proportions with respect to the amount of phenol present. Under influence of the carbon dioxid, the phenol and formaldehyde react to produce an oily liquid initial condensation product which, at first, floats upon the surface of the water resulting from the reaction or added with the reagents, but which, on standing, increases in specific gravity and sinks below the water. The condensation product may be readily separated and treated further, in accordance with well-known methods, for the production of hard, infusible and insoluble final condensation products.

When hexamethylene-tetramin is employed as the reacting methylene body, an initial condensation product is formed, according to well-known methods, by mixing anhydrous phenol with dry hexamethylene-tetramin and exposing the mixture to heat. The materials may be mixed in various proportions, but it is preferable to mix them in substantially equivalent combining proportions, that is to say, six molecules of phenol being mixed with one molecule of hexamethylene-tetramin. Under these circumstances, an initial condensation product is produced by reaction between the phenol and the methylene groups of the hexamethylene-tetramin with the aid of the ammonia which is liberated by the decomposition of this body and which serves as the condensing agent. This product is capable of being molded only with difficulty, since it will not harden under the simple application of heat and pressure, unless the heat treatment is continued for a considerable time, on account of the free phenol which it contains. Products of this character are therefore not suitable for use in molding operations in which the hardening must be accomplished very quickly.

My present invention is particularly well adapted to hasten the hardening of condensation products of the character just described. I proceed by dissolving the initial condensation product in alcohol containing sufficient hexamethylene-tetramin to combine with the free phenol that is present and then passing gaseous carbon dioxid through the solution for a short time, suitably for half an hour. The carbon dioxid decomposes the hexamethylene-tetramin, with evolution of formaldehyde and ammonia, and the formaldehyde thus evolved combines with the free phenol of the initial condensation product. The small amount of ammonia that is liberated concurrently with the formaldehyde serves as the condensing agent in this reaction, and the carbon dioxid present may also contribute a condensing effect. After being treated in the manner described above, the resin is separated from the alcoholic solution and subjected to heat and pressure in the usual manner, with or without the addition of the usual inert fillers. This material hardens very rapidly and is, therefore, capable of application in commercial molding operations.

As has been indicated above, a variety of substances and process steps are suitable for use in practising my present invention, and it is therefore to be understood that no limitations are to be imposed upon my invention except such as are indicated in the appended claims.

I claim as my invention:

1. A process for the manufacture of resinous products which consists in producing a partially hardened condensation product by reacting upon a phenolic substance with a material containing an active replaceable methylene group and causing the resulting product to harden further by treating the said product with carbon dioxid.

2. A process for the manufacture of resinous products which consists in producing a partially hardened condensation product by reacting upon a phenolic substance with a material containing an active replaceable methylene group, and causing the resulting product to harden further by treating the said product with carbon dioxid and then applying heat thereto.

3. A process for the manufacture of resinous products which consists in producing a partially hardened condensation product by reacting upon a phenolic substance with a material containing an active replaceable methylene group, and causing the resulting product to harden further by treating the said product with carbon dioxid, and then applying heat and pressure thereto.

4. The method of making a shaped resinous condensation product which comprises reacting upon a phenolic substance with a material containing an active replaceable methylene group, dissolving the resulting resinous product in a solvent containing a substance having an active replaceable methylene group, treating the solution product with carbon dioxid, separating the resulting resinous material from the solvent and molding the said resinous material with the application of heat.

5. A process for the manufacture of resinous products which comprises reacting upon a phenolic substance with hexamethylene-tetramin in the presence of carbon dioxid as a condensing agent.

6. A process for the manufacture of resinous products which comprises reacting upon a phenolic substance with hexamethylene-tetramin in the presence of carbon dioxid as a condensing agent, and then applying heat to the resulting condensation product.

7. A process for the manufacture of resinous products which comprises reacting upon a phenolic substance with hexamethylene-tetramin in the presence of carbon dioxid as a condensing agent and then applying heat and pressure to the resulting condensation product.

8. A process for the manufacture of resinous products which consists in reacting upon a phenolic substance with hexamethylene-tetramin, and treating the resulting material with carbon dioxid to cause or promote condensation.

9. A process for the manufacture of resinous products which consists in reacting upon a phenolic substance with hexamethylene-tetramin, treating the resulting material with carbon dioxid to cause or promote condensation, and then applying heat to the product.

10. A process for the manufacture of resinous products which consists in reacting upon a phenolic substance with hexamethylene-tetramin, treating the resulting material with carbon dioxid to cause or promote condensation, and then applying heat and pressure to the product.

11. The method of making a shaped resinous condensation product which comprises reacting upon a phenolic substance with hexamethylene-tetramin, dissolving the resulting product in a solvent containing a substance having active replaceable methylene groups, treating the solution with carbon dioxid, separating the resulting resinous material from the solvent and molding the said material with the application of heat.

12. The method of making a shaped resinous condensation product which comprises reacting upon a phenolic substance with hexamethylene-tetramin, dissolving the resulting product in a solvent containing hexamethylene-tetramin, passing carbon dioxid through the solution, separating the resulting resinous material from the solvent and molding the said material with the application of heat.

In testimony whereof, I have hereunto subscribed my name this 1st day of Dec. 1915.

JAMES P. A. McCOY.